United States Patent [19]

Pollman

[11] 4,330,444
[45] May 18, 1982

[54] SIZING COMPOSITION AND SIZED FIBERS WITH INCREASED HARDNESS

[75] Inventor: Gary A. Pollman, Sylvania, Ohio

[73] Assignee: PPG Industries, Inc., Pittsburgh, Pa.

[21] Appl. No.: 72,711

[22] Filed: Sep. 4, 1979

[51] Int. Cl.$^3$ .................. C08L 91/00; C08L 63/02
[52] U.S. Cl. .................. 523/404; 65/3.44; 65/3.43; 428/378; 523/408; 523/409; 523/411; 523/412
[58] Field of Search ........... 260/29.2 EP, 29 4 R, 260/29.4 UA, 29.6 NR, 29.2 TM, 18 EP; 65/3 C; 428/378

[56] References Cited

U.S. PATENT DOCUMENTS

| | | | |
|---|---|---|---|
| 2,946,701 | 7/1960 | Plueddemann | 117/72 |
| 3,082,183 | 3/1963 | Boyd | 260/29.6 |
| 3,169,884 | 2/1965 | Marzocchi et al. | 260/29.2 M |
| 3,336,253 | 8/1967 | Wong et al. | 260/29.2 |
| 3,556,754 | 1/1971 | Marsden et al. | 65/3 |
| 3,817,898 | 6/1974 | Ward | 260/29.2 EP |
| 3,827,230 | 8/1974 | Marzocchi et al. | 57/140 G |
| 3,888,645 | 6/1975 | Marzocchi | 65/3 |
| 3,920,313 | 11/1975 | Wong et al. | 428/375 |
| 3,935,344 | 1/1976 | Haggerty et al. | 428/378 |
| 3,949,014 | 4/1976 | Maki et al. | 260/836 |
| 4,051,195 | 9/1977 | McWhorter | 260/837 R |
| 4,146,700 | 3/1979 | Waddill et al. | 528/94 |

*Primary Examiner*—Theodore E. Pertilla
*Attorney, Agent, or Firm*—Kenneth J. Stachel

[57] ABSTRACT

Sizing composition for glass fibers, method of making same, method of making sized glass fibers and sized glass fibers are provided to have improved sized glass fibers for use in thermosetting molding compounds. The improved sized glass fibers are produced with improved processability and have good handling characteristics and give improved properties to thermosetting molding compounds.

The sizing composition is an aqueous sizing composition having water soluble or dispersible, liquid epoxy resin, melamine formaldehyde condensate, polyamide resin and thermoplastic plasticizing agent, and one or more silane coupling agents.

The method of preparing the sizing composition involves adding the melamine formaldehyde condensate and polyamide resin before the addition of or in the presence of the epoxy resin.

The sized glass fibers are in contact with dried residue of the epoxy resin, melamine formaldehyde-polyamide reaction product, thermoplastic plasticizing agent and one or more silane coupling agents.

13 Claims, No Drawings

SIZING COMPOSITION AND SIZED FIBERS WITH INCREASED HARDNESS

BACKGROUND OF THE INVENTION

The present invention is directed to a sizing composition and sized fibers useful as reinforcement for polymers. More particularly, the present invention is directed to a sizing composition for glass fibers to produce sized glass fibers with improved performance in polymeric compounds, and with improved processability, and with improved handling characteristics.

Reinforced thermosetting unsaturated polyester based molding compounds can be produced with several forms of glass fiber reinforcement. These types include roving, continuous strand, chopped fibers, mat, and woven fabrics, and the like. Reinforced thermosetting plastic composites produced from thermosetting molding compounds like bulk molding compounds, and sheet molding compounds typically have about 15 to 25 and 25 to 45 percent glass fiber content respectively. In bulk molding compounds, the fibrous reinforcement is usually in the form of randomly dispersed short fibers generally of length of about ¼ inch to 1 inch. The short fibers can be produced from continuous strand that has contacted the unsaturated polyester resin or resin system and subsequently chopped into short lengths. In the sheet molding compounds, sometimes known as "prepreg" (preimpregnated mat) the fibrous reinforcement is present either as a continuous filament, chopped strand mat, or as chopped fibers deposited on a supporting carier, the fiber filler is impregnated with the unsaturated polyester resin system giving rise to sheets of molding compound in which the fibers have not been subjected to the degradating action of conventional molding compound mixtures. In addition to the conventional composites formed from bulk molding compounds and sheet molding compounds, molding compounds with higher amounts of fiber reinforcement can also be used in producing composites. Two families of fiber glass reinforced molding sheets that have recently been commercialized are the XMC ® composites and the HMC ® composites available from PPG Industries, Inc., Pittsburgh, Pennsylvania. These composites have high strength for structural uses. The HMC ® composites offer isotropic strength properties approaching twice those of conventional sheet molding compound, by employing high glass fiber content with little or no filler. The XMC ® composites are directionally oriented, moldable, resin-glass fiber sheets containing 65 to 75 percent continuous reinforcement.

Glass fibers used as reinforcement for thermosetting molding, compounds are formed by being drawn at high rates of speed from molten cones of glass formed at the tips of small orifices in a platinum device called a bushing. In order to protect the glass fibers from interfilament abrasion during formation and further processing and to make them compatible with the polymeric materials used in the thermosetting molding compounds, a sizing composition is applied to the fibers during their formation.

The sizing compositions used to obtain acceptable fiber glass reinforced molding composites generally contain lubricants, film-formers, coupling agents, wetting agents, emulsifiers and the like. The solubility of the glass fiber sizing composition in ethylenically unsaturated organic solvents can affect the final properties of the molded product, since a myriad of applications of thermosetting molding composites utilize unsaturated polyesters or vinylester resins. For example, in the process of producing sheet molding compound reinforcement in the form of glass fiber mat, chopped glass fibers, and continuous glass fiber roving, the reinforcement comes in contact with the resin system which is usually an unsaturated polyester resin system. The glass reinforced resin system is heated to and maintained at an elevated temperature and is transported by a carrier like polyethylene or cellulose films or sheets which are present above and below the resin system. When the reinforcement is in the form of chopped glass fibers, the chopped glass fibers come to rest on the moving film of resin covered polyethylene or cellulose and another layer of resin system is placed onto the chopped reinforcement along with another sheet or carrier and this sandwiched sheet molding compound is fed through compression rollers to effect impregnation of the glass by the resin mix and to distribute the resin, then the composite is rolled in packages of desired length. When the reinforcement is glass fiber mat, it is contacted with the resin system and is interleaved between polyethylene or cellulose sheets and passed through the compression rolls. Any further kneading or compression, if required, can be performed by ribbed rollers.

During the operation of producing a molding compound like sheet molding compound, the glass fiber reinforcement in any form is subjected to a multitude of forces and conditions that may tend to cause glass fibers to filamentize or become separated and possibly reduce the association of the strand with the resin. The affects of the filamentizing and reduced association are poor performance in the molding, cyclability, flow and solubility of the glass fiber reinforcement in the molding compound. Also affected would be the dispersion of the glass fiber reinforcement in the resin where the molding compound formed from the unsaturated polyester and the glass fiber reinforcement has good homogeneity which is usually referred to as "wet-through" or "flow-through". It is desirable to have a high degree of wet-through in a bulk molding compound, sheet molding compound and the HMC ® composites and the XMC ® composites, in order that the final physical properities of the composites and the processability thereof is at their maximum levels. Also, the association of the glass fibers with the resin usually referred to as "wet-out" during compounding means that the resin encapsulates the glass fibers and no bare glass is visible throughout the formed, molded compound. Wet-out during compounding is in measure the apparent intimacy of contact between the resin matrix and the glass fibers. If the glass fibers are not immediately wet-out following compounding, it is expected that they will wet-out on aging due to the increase in the viscosity of the compound. This leads to adverse effects on the processability, molding characteristics, and surface properties of the final molded article or composite.

It is an object of the present invention to provide a sizing composition to give glass fiber improved integrity in order that they remain intact during processing to produce reinforced molding compounds and composites therefrom.

It is a further object of the invention to provide a sizing composition to give glass fibers that when used as reinforcement in molding compounds enables production of the molding compounds at good molding rates, with good cycle times, with good flow-through, and with good wet-out properties.

It is a further additional object of the present invention to provide a sizing composition which yields sized glass fibers having improved integrity between the glass fibers and the polyester resin, or vinylester resin, or epoxy resin of a thermosetting molding compound in the production of thermosetting molding sheet composites.

It is another object of the present invention to provide a sizing composition for use with glass fibers that yields sized glass fibers for use in thermosetting molding compounds, wherein the sized glass fibers are produced with improved processability and have improved handling characteristics.

SUMMARY OF THE INVENTION

According to the present invention, there is provided an aqueous sizing composition for use in treating glass fibers to produce sized glass fibers that are produced with improved processability and have good handling characteristics, and that when used in molding compounds enable the production of the molding compound at good molding rates, with good cycle time, and with good flow-through and wet-out properties and with integrity to remain intact while experiencing the myriad forces and conditions in the processing compounds and composites made therefrom.

The sizing composition of the present invention has an epoxy resin that is non-crystallizing and at least water dispersible and may be water soluble; formaldehyde or formaldehyde donor capable of reacting with malamine to form a condensate; melamine present to form a condensate with the formaldehyde or formaldehyde donor; and polyamide resin; and one or more silane containing coupling agents. The sizing composition can also have a blend of vinyl-acrylic copolymer with epoxy resin, and anti-static agents, and surfactants, and external type lubricant. The amounts of the components in the sizing composition are such that the ratio of formaldehyde melamine condensate and polyamide resin to epoxy is not too high so as to produce a sizing composition having too low a solubility.

In the method of the present invention, the components of the sizing composition are prepared in such a manner as to allow the production or addition of the formaldehyde malamine condensate along with the addition of the polyamide resin before the addition of or in the presence of the water dispersible or soluble, non-crystallizing epoxy resin. The silane coupling agent or agents can be added to the components in the sizing composition or the components of the sizing composition can be added to aqueous solutions of the silane coupling agent. In addition, specific or generally used film-formers, lubricants, surfactants, emulsifiers, antistatic agents, modifiers and the like can be added to the sizing composition of the present invention. The prepared sizing composition is used to treat glass fibers and the treated glass fibers are dried to facilitate removal of moisture from the glass fibers and to harden the epoxy containing sizing composition on the treated glass fibers. The sized glass fibers of the present invention contain a dried residue having an epoxy resin, malamine formaldehyde condensate, polyamide resin and one or more silane coupling agents, wherein the epoxy resin is reacted or unreacted with the malamine formaldehyde condensate or polyamide resin. In addition, the dried residue can contain a vinyl-acrylic copolymer-epoxy resin blend, anti-static agents, surfactants and external lubricant.

DETAILED DESCRIPTION OF THE INVENTION

In the sizing composition, method of producing sized glass fibers and the sized glass fibers, there are one or several principles or theories believed to be involved to produce the harder sized glass fibers of the present invention for use in molding compounds, particularly for bulk molding compounds.

One theory is that the sizing composition should have a low solubility in the system used in molding compounds and composites. In the sizing composition of the present invention, the formaldehyde and the melamine undergo a degree of reaction to produce some melamine formaldehyde condensates and the condensate may react with the polyamide resin to form a cross-linking mechanism. Such a reaction would occur at polymeric reaction conditions and also at the conditions used in preparing sized glass fibers, where the temperature ranges from ambient temperature to the temperature of drying the sized glass fiber strands. It is also believed that any free formaldehyde or melamine, or formaldehyde melamine condensates and polyamide resin or formaldehyde melamine condensate-polyamide resin mechanism may react with epoxy resin in the sizing composition. These beliefs do not restrict or limit the sizing composition, method of producing sized glass fibers, or sized glass fibers of the present invention. If a reaction with the epoxy does occur, then a film-forming system is produced on the sized glass fibers. If there is not a reaction of the formaldehyde melamine condensate and polyamide resin with the epoxy resin, then the film-forming system of the sizing composition is the formaldehyde melamine condensate and possibly the polyamide resin while the epoxy resin acts as a wetting agent and a film-former.

The epoxy resin useful in the sizing composition of the present invention is a water dispersible or water soluble, substantially noncrystallizing epoxy resin. Non-exclusive examples include phenolic epoxy resins which are obtained by the reaction of a stoichometric excess of an epihalohydrin, such as epichlorhydrin, with a polyhydric phenol such as bis(4)-hydroxyphenyl-2-propane, bis(hydroxyphenyl methane) that is obtained by the acid condensation of two moles of phenol with one mole of formaldehyde, hydroquinone, resorcinol and the like. Such compounds are characterized by their phenolic backbone and also the presence of terminal epoxy groups. These compounds are further described by the U.S. Pat. Nos. 2,324,483; 2,444,133; 2,494,295; 2,500,600; 2,511,913; the disclosures of which are incorporated herein by reference. By varying the proportions of the epihalohydrin and the phenolic polyhydroxy compound and/or by varying the reaction conditions, compounds of low intermediate or higher molecular weight may be produced which range from liquids to solids. The solid epoxy resins can be used if they are dispersible in water although liquid epoxy resins present fewer problems with the machinery used in forming sized glass fibers. Typically, the molecular weights range from between about 300 and about 900 or more and preferably from about 300 to about 400. The epoxy resin or resins can be used in an amount of about 5 to about 15 percent by weight based on the total weight of the sizing composition. Particularly suitable epoxy resins for use in the sizing composition of the present invention, are designated "Epi-Rez ED 30115" commercially available from Celanese Polymer Specialties Company and "Genepoxy 370-H55" commercially available from General Mills Chemical Company. These epoxy resins are epoxy resin dispersion which have approximately 50 to 60 percent nonvolatiles, where the only volatile is water, and a weight per epoxide of approximately of around 500 to 550, a pH of 8.3 and an average particle size between 1 and 4 microns. The preferred epoxy resin used in the sizing composition is the Genepoxy resin and the preferred amount of the epoxy resin used is in the range of about 8 to about 12 weight percent of the total aqueous sizing composition. The general range of amounts for the epoxy resin is from about 3 to about 20 weight pecent or higher of the aqueous sizing composition.

The formaldehyde used to react with melamine thus yielding the melamine formaldehyde condensates, can be any form of formaldehyde capable of such reaction. The formaldehyde may be a formaldehyde donor that produces free formaldehyde before the production of the condensate or the formaldehyde may be a formaldehyde polymer such as paraformaldehyde. The formaldehyde may also be in the form of formalin, a 37 percent aqueous solution of formaldehyde. The preferred form of formaldehyde is the paraformaldehyde polymer or resin. Melamine can be added to the formaldehyde in any known method to form the melamine formaldehyde condensate before the addition of or in-situ with the polyamide resin and epoxy. The melamine formaldehyde condensates formed are water soluble and cure rapidly. It is preferred to use the condensate with the polyamide resin and epoxy resin rather than forming the condensate in-situ. A suitable formaldehyde melamine condensate is designated as "Tybon 1765-A", which is available from Pacific Resins and Chemicals, Inc., Tacoma, Wash., or Newark, Ohio. The "Tybon 1765-A" has a percent solids of around 47, a specific gravity of 1.2 to 1.22 and a weight per gallon in pounds of about 10.2 and a pH of around 7.5 to 8.0 with a viscosity in Gardner-Holdt units of $A_2B$. The amount of melamine formaldehyde condensate used is that generally in the range in a molar ratio of about 2 and up to 20 moles per mole of the polyamide resin present in the sizing composition. It is preferred that the amount of formaldehyde melamine condensate be in the range of about 2 parts liquid weight to 6 parts per liquid weight per one part liquid weight of the polyamide resin component of the sizing composition.

In general, the amount of the melamine formaldehyde resin present in the sizing composition is in the range of about 3 to about 15 weight percent of the total aqueous sizing composition.

The polyamide-functional resin suitable for use in the present invention may be any amide-containing resin that can be water or alcohol solubilized and is known to be used with epoxy resins. Non-exclusive examples of polyamide-functional resins include polyamides based on dimerized fatty acids and having some residual unsaturation, reaction products of fatty acids or polymerized fatty acids and alkylene polyamines, hybridized polyamides such as blends of polyamide resin with an amino-amide adduct of a fatty acid and a alkylene polyamine, polyamide/epoxy adducts, polyamide/polyester adducts prepared from polybasic acids and a alkanolamine or mixture of aliphatic polyamine and polyhydric alcohols, polyvinyl alcohol/polyamide adducts, and polyamides obtained from dicarboxylic acids or their esters and di-primary polyamines. A particularly suitable amide-containing resin useful in the present invention is designated "Tybon 1765-B", available from Pacific Resins and Chemicals, Inc. The Tybon B material has a percent solids around 47.5 to 49.5, a specific gravity of 1.125 to 1.14, a weight per gallon in pounds of about 9.3, a pH of about 9 to about 10, and a viscosity of C-F. The amount of polyamide or amide-containing resin used is generally about ½ to 1/6 the amount of melamine-formaldehyde condensate used and generally is in the range of about 1 to about 8 weight percent of the aqueous sizing composition.

In addition to the epoxy resin, melamine formaldehyde condensates and polyamide resin, it is preferred to have present in the sizing composition a plasticizing component in particular one having a thermoplastic nature to make the sized glass fiber more thermoplastic and give the fibers some ribbonization. Non-exclusive examples of thermoplastic plasticizing materials that can provide this result to the sized glass fibers include a blend of a vinyl-acrylic copolymer with an epoxy resin such as that designated "Covinax 153 DEV" available from Franklin Chemical Industries. The vinylacrylic copolymer with epoxy resin blend is an emulsion which has a particle charge which is anionic, a viscosity of 2000 to 3000 centipoise, solids of around 50 to 52 percent, a pH of 4 to 5, a weight per gallon in pounds of 9. Other materials that can be used to provide the results of thermoplastic character and ribbonization to the sized glass fibers include material designated National 1048, which is polyvinylacetate; Witcobond-W-233 which is a polyurethane material; RD 1135B, which is a reaction product of a partial ester of a carboxylic acid and a compound containing more than one epoxy group per molecule as taught in U.S. Pat. No. 3,437,517 hereby incorporated by reference; and National X 3724 a silane polyvinylacetate copolymer and National 1029 a plasticized polyvinylacetate. The amount of this component used in the present invention is generally in the range of about 1 to about 12 weight percent of the aqueous sizing composition, and preferably in the range of about 3 to about 8 weight percent of the aqueous sizing composition.

One or more silane coupling agents can be used in the sizing composition of the present invention. Non-exclusive examples of suitable silane coupling agents include silylated polyazamides; cationic silanes containing unsaturation; e.g. and N-B-(N-vinylbenzylamino) ethyl-gamma-aminopropyltrimethoxysilane, aminosilanes; beta-(3,4-epoxy cyclohexyl) ethyltrimethoxysilane; and gammamethacryloxypropyltrimethoxysilane.

The silylated polyazamide coupling agents are described in U.S. Pat. No. 3,746,738 (Pepe et al) hereby incorporated by reference, as polyazamide polymers which contain at least secondary nitrogen in their backbone, where a silane group is pendantly or internally bonded to the polyazamide moiety. The polyazamide moiety comprises a polycarboxamide containing secondary nitrogen atoms therein, which are separated from the carbonyl moieties of the carbamide groups by divalent alkylene groups containing one to three inconclusive saturated carbon atoms, and has a nitrogen to carbon mole ratio of at least 1.5 and not exceeding 2.6. Each bonded silicon atom of the silane is bonded through a carbon atom of an organic group which is directly bonded to a nitrogen atom of the polyazamide by a carbon to nitrogen bond. The remaining three valences of each silicon group are bonded to at least monovalent organic radical by carbon to silicon bond to form silane, which in turn is bonded to another silane group. The weight of the pendant silane groups does not exceed twice the amount of the polyazamide moieties and comprise at least 0.25 weight percent of the total compound. These compounds may be formed by the Michael addition method or a haloalkylation method where one of the reactions in forming the polyazamide contains a silane group or silicon bonded thereto. The silane can also be incorporated in the ammonolysis (amidation) reaction to form the polyazamide structure or it can also be incorporated by post treating the polyazamide. Post treatment is accomplished by reacting a functional silicon with the polyazamide. The silylated polyazamides are described in U.S. Pat. No. 3,746,738 where the silicon moiety and functional organic silicon compound for post treatment is a silane; or where the reaction includes a reactant containing a silicon bonded thereto that later forms a silane. The silylated polyazamide compounds are commercially available from Union Carbide Corporation, New York, under the designations of "Y-5922, Y-5923, Y-5986 and Y-5987". In the sizing composition of the present invention the polyazamides can be used alone or in combination to give an amount of silylated polyazamide in the range of about 0.05 to about 2.0 weight percent based on total weight of the aqueous sizing composition.

Any suitable cationic silane containing unsaturation may be used alone or in combination with other coupling agents with the sizing composition of the present invention. The cationic silane with unsaturation can be used in the form of a quaternary salt or of the amine or amide hydrochloride salt. Non-exclusive examples of cationic silanes with unsaturation include: cationic methacrylate functional silanes having a formula similar to the following:

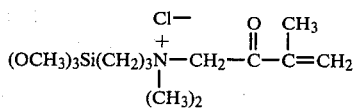

or

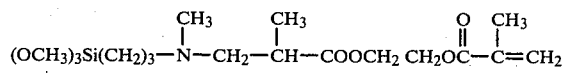

where the latter is prepared by the mono-addition of ethylene dimethacrylate to methylaminopropyltrimethoxysilane; and cationic functional silanes having a formula similar to the following:

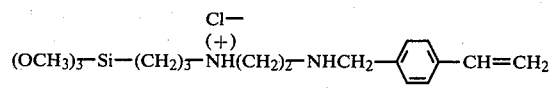

and cationic vinylfunctional silane having a formula similar to the following:

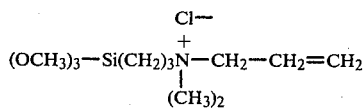

A cationic methacrylate or styrene functional silane are more fully described in and can be prepared in accordance with the teachings of E. P. Pluddemann, in "Cationic Organo Functional Silane Coupling Agents", Society of Plastics/Composites Institute, RPC Proceedings 27, 21B (1972) hereby incorporated by reference. The quaternary solids can be prepared in accordance with methods common in the art by quaternization of amines and amides. One cationic methacrylate functional silane particularly suitable in the sizing composition of the present invention is designated "Y-5823" available from Union Carbide Corporation. Other cationic silanes containing unsaturation can be used including methacrylate functional "Z-6031" silane and styrene functional "Z-6032", silanes available from Dow Corning Corporation and a styrene functional "Y-9014" silane available from Union Carbide Corporation. The amount of cationic silane with unsaturation preferably the methacrylate functionality used in the sizing composition is in the range of about 0.05 to about 2 weight percent based on the aqueous sizing composition.

Another type of silane that can be used in the sizing composition is a monoamino or polyaminofunctional silane. The aminofunctional silanes range in composition from the single primary amino group of gamma-aminopropyltriethoxysilane to the primary-secondary diaminofunctional silane of N-beta(amino ethyl) gamma-aminopropyltrimethoxysilane and polyaminofunctional silanes. One particularly useful aminofunctional silane for the sizing composition of the present invention is an aminofunctional silane in a 40 percent methanol solution designated "Z-6026" available from Dow Corning Corporation. This silane solution has a specific gravity at 77° F. (25° C.) of 0.89 and a refractive index at 75° F. (24° C.) of 1.374 the silane ingredients in weight percent are 4 percent the flash point in a close cup in degrees is 40° F. (4.4° C.). The amount of the aminofunctional silane used in the sizing composition of the present invention is in the range of about 0.05 to about 2.0 weight percent of the total weight percent of the sizing composition.

Although any one or more than one of the above-mentioned silane coupling agents can be used in the sizing composition of the present invention in the preferred embodiment, the cationic silane with unsaturation is used while in an alternative embodiment three coupling agents are used. These include the silylated polyazamide coupling agent, the cationic methacrylate coupling agent and the aminofunctional silane coupling agent in a 40 percent methanol solution and all of these silane coupling agents are used in an amount in the range of about 0.05 to about 2.0 weight percent based on the aqueous sizing composition.

In addition to the above-mentioned components in the sizing composition, an amount of ammonium chloride (NH$_4$Cl) is used in an amount in the range of about 0.05 to about 1 weight percent of the aqueous sizing composition. This compound is used in the preferred embodiment as an anti-static agent to reduce static in the sized glass fibers. Any chemical compound known to reduce static in sized glass fibers and that is water soluble or dispersible can be used in lieu of the ammonium chloride.

Other well known lubricants, film-formers, coupling agents, modifying agents, anti-static agents, and the like for use in sizing compositions for treating glass fibers can be used in the sizing composition of the present invention. Non-limiting examples include polyethylene glycol 600 monolaurate, a monolaurate ester of polyethylene glycol having an average molecular weight of 600 can be added in an amount generally used; lubricants that are of the external type such as polyalkylene polyols such as "Pluracol® V-10 or V-11 polyols" both available from BASF Wyandotte Corporation in amounts around 0.05 to about 4; polyethylene glycols like those having a molecular weight of approximately 1000 available as CARBOWAX® 1000; fatty glycerides like glycerine; propylene oxide surfactants such as "Pluronic P104"; and octylphenoxypolyethoxyethanol available as "Triton X-100" from Rohm and Haas Company, which is an emulsifier. All of these compounds may be individually present in amounts in the range of around 0.05 to about 4 weight percent of the aqueous sizing composition.

The sizing composition of the present invention can be prepared by reacting the melamine formaldehyde condensate component with the polyamide resin component then adding the epoxy resin and the remaining components of the sizing composition, or the silane coupling agents can be placed in water and the melamine formaldehyde condensate component and polyamide resin component added to this aqueous mixture with the addition of the epoxy resin and the remaining components of the sizing composition. It is preferred to prepare the sizing composition by first adding the preferred cationic silane coupling agent to water and mixing, then adding the formaldehyde melamine condensate and the polyamide resin components, and then dissolving the ammonium chloride in water and adding it to the mixture. To this mixture the epoxy resin is added and after this addition the vinylacrylic copolymer epoxy resin blend is added and the mixture is diluted to final volume. The aqueous sizing composition has a solids content from about 3 to about 20 weight percent or higher, preferably from about 15 to about 20 weight percent.

After the sizing composition has been prepared it is pumped in a recirculating fashion to a binder applicator which applies the sizing to the glass filament during their formation. The glass fibers are formed by pulling molten glass streams from a bushing at a high rate of speed and applying the sizing composition to the fibers formed from the molten streams by a roller type applicator which is immersed in the sizing composition. The fibers are then gathered into a strand and wound on a collet to produce a forming package. The forming package is removed from the winder and dried in a forced air oven or a dielectric oven until substantially all the water is removed therefrom and for initiation of the curing of the sizing composition on the glass fibers. Subsequent to drying the sized glass fibers can be unwound and used for reinforcement, fabricated into chopped strand, formed into roving or the like for use in molding compounds. It is preferred in the treatment of the glass fiber strands with the sizing composition that the amount of composition placed on the fibers is around 0.5 to about 3 weight percent.

After the sized glass fibers have been dried, it is believed without this belief limiting the scope of the invention that the sized glass fibers are glass fibers with the residue of an epoxy resin, melamine formaldehyde polyamide reaction product, polyvinylacrylic copolymer epoxy resin, silane coupling agent, and ammonium chloride. Preferably, the silane coupling agent is the residue of cationic methacrylate and alternatively the coupling agents are the residue of silylated polyazamide cationic methacrylate silane, and aminofunctional silane.

The invention will be further elucidated by the following examples.

EXAMPLE I

A sizing composition was prepared having the components of the following formulation:

| Components | Amount in Wt. % of the total aqueous composition of 378.5 kg of water |
|---|---|
| Epoxy resin dispersion (Epi-Rez ED30115) | 9.2 |
| Melamine formaldehyde condensate (Tybon N1765A) | 6.2 |
| Polyamide resin (Tybon N1765B) | 3.1 |
| Blend of vinylacrylic copolymer and epoxy resin (Covinax 153) | 3.1 |
| Cationic methacrylate (Y-5823) | .39 |
| Aminofunctional silane in 40% methanol (Z-6026) | .39 |
| Silylated polyazamide (Y-5987) | .39 |
| Ammonium chloride | .22 |

This sizing composition was prepared by first adding the aminofunctional silane in methanol to around 50 gallons of water and adjusting the pH to around 6 with acetic acid. To this aqueous solution there was added the cationic methacrylate functional silane. In a separate vessel, the silylated polyazamide was added to 4 gallons of water and stirred and added to the aqueous mixture containing the other silane coupling agents. To the silane coupling agent mixture, the formaldehyde melamine condensate resin was added and then the polyamide resin was added. After this addition, the ammonium chloride was dissolved in 2 gallons of water and added to the aqueous mixture. The epoxy resin dispersion was then added to the aqueous mixture followed by the addition of the vinylacrylic epoxy emulsion. This aqueous mixture was then added to the final volume of 378.5 liters and was mixed for around 5 minutes and tested for solids and pH. The sizing properties were solids content of 15.5 percent plus or minus 0.5 percent, sizing application of 2.2 percent plus or minus 0.3 percent and a pH of 8.4 plus or minus 0.3.

This sizing composition was used to treat K-37/2 glass fibers to obtain sized glass fibers on a forming package. The sized glass fibers were then oven dried at a temperature of 275° F. (135° C.) for a period of 11 hours. During the production of the sized glass fibers, the processability of the sizing composition and sized glass fibers were rated as acceptable and the roving application from the dried sized glass fibers was rated as good to excellent. Roving formed from the sized glass fibers was then used to produce sheet molding compounds. The chopping of the roving gave a low static and a good break-up with good to excellent wet-out. Results such as these are more fully shown in Table II.

EXAMPLE II

A sizing composition was formulated from the components listed below:

| Components | Amount in Wt. % of the total sizing composition |
|---|---|
| Epoxy resin dispersion (Genepoxy) | 9.3 |
| Melamine formaldehyde resin (Tybon N1765A) | 6.2 |
| Polyamide resin (Tybon N1765B) | 3.1 |
| Polyvinyl acetate-epoxy resin blend (Covinax 153DEV) | 3.1 |
| Cationic methacrylatefunctional coupling agent (Y5823) | .39 |
| Ammonium chloride | 0.22 |

The sizing composition was formulated and mixed by adding the cationic methacrylate functional silane coupling agent to 50 gallons (1.25 liters) of water and adding the melamine formaldehyde condensate resin and then the polyamide resin to this aqueous solution. Ammonium chloride was dissolved in 2 gallons (7.6 liters) of water and added to the aqueous solution. After this addition, the epoxy resin dispersion was added to the aqueous solution and then the polyvinyl acrylate-epoxy resin blend was added to the aqueous solution. The aqueous solution was diluted to a final volume of 378.5 liters mixed for 5 minutes and then tested for solids and pH. The solids of the sizing composition were about 13.5 plus or minus 0.5 percent and the pH was 7.0 plus or minus 0.5.

This sizing composition was used to treat K-37/2 glass fibers in the conventional manner to give an application in (LOI), loss on ignition, of 2.2 percent plus or minus 0.3 percent of the sizing composition on the glass fiber strands. The sized glass fiber strands were treated in an oven at 270° F. (132° C.) for 11 hours. Sixteen forming packages were used to produce a roving package in the conventional manner and the roving package was used in the production of sheet molding compound and composites therefrom.

EXAMPLE III

A sizing composition was made in a similar manner to a sizing composition of Example I from the components listed in the formulation below:

| Components | Amount in Wt. % of the total aqueous sizing compostion |
|---|---|
| Epoxy resin dispersion Epi-Rez ED30115) | 12.0 |
| Melamine formaldehyde resin (Tybon N1765A) | 8.0 |
| Polyamide resin (Tybon N1765B) | 4.0 |
| Polyvinyl acetate-epoxy resin blend (Covinax DEV-153) | 4.0 |
| Catonic methacrylate-functional coupling agent | 0.5 |
| Aminofunctional silane coupling agent (Z-6026) | 0.5 |
| Silylated polyazamide | 0.5 |
| Ammonium chloride | 0.3 |

This sizing composition was used to treat K-37/2 glass fibers in a manner similar to that in Example I for use in production of roving to be used in sheet molding compound and composites made therefrom.

EXAMPLE IV

Table I below shows sizing composition formulations that were prepared in a manner similar to Example I or Example II depending on the number of silane coupling agents, and used to treat glass fibers in a manner similar to Example I.

TABLE I

| Component | Amount in Weight Percent of Total Aqueous Sizing Composition | | | | |
|---|---|---|---|---|---|
| | Formulation 1 | Formulation 2 | Formulation 3 | Formulation 4 | Formulation 5 |
| Epoxy Resin Dispersion (ED 30115) | 9.0 | — | — | 10.0 | 12.0 |
| Epoxy Resin Dispersion (Genepoxy 70-H55) | — | 9.0 | 12.0 | — | — |
| Melamine Formaldehyde Resin (Tybon N1765A) | 6.0 | 6.0 | 8.0 | 6.0 | 8.0 |
| Polyamide Resin (Tybon N1765B) | 3.0 | 3.0 | 4.0 | 4.0 | 4.0 |
| Vinyl acrylic-epoxy resin blend (Franklin Covinax 153 DEV) | 3.0 | 3.0 | 4.0 | 8.0 | 4.0 |
| Cationic methacrylate-functional silane coupling agent (Y5823) | 0.5 | 0.5 | 0.5 | 0.8 | — |
| Ammonium chloride | 0.25 | 0.25 | 0.25 | — | — |
| Pluracol V-10(polyalkylene polyols) | — | — | 0.7 | — | — |
| N-B-(N-vinylbenzylamino)ethyl-r-amino propyltrimethoxy-silane (Z-6032) | — | — | — | — | 0.6 |
| Pluronic P104 (Propylene oxide) Surfactanct) (Wyandotte Chemicals Corp.) | — | — | — | — | 1.5 |
| Glycerine | — | — | — | — | 1.0 |
| SAG 470 | — | — | — | — | 3ml |
| Carbowax 1000 | — | — | — | 1.0 | — |

Table II presents data on the production of sheet molding compound using sized glass fibers treated with the sizing composition of Example II. Also, a commercial roving product available from Owens-Corning Fiberglass Corp. and designated "951" was used in making sheet molding compound for comparison purposes.

TABLE II

Production of Sheet Molding Compound from Roving of Sized Glass Fibers of Examples and Commercial

| Roving Glass Fibers | LOI Forming pkg % Avg | LOI Roving % Avg | Strand Integrity | Hardness | wet-out Glass Z | SMC Results | | Test Results | |
|---|---|---|---|---|---|---|---|---|---|
| | | | | | | wet-through wrap-up | Strand Integrity Ribbon | Avg. Tensile Strength | Avg. Flexural Strength |
| Example-2 | 2.01 | 2.51 | good | stiff | 95 | 90 | 1-0 | 10,247 | 27,617 |
| Example-2 | 2.51 | 2.34 | fair | stiff | 100 | 95 | 1-10 | 7,671 | 24,969 |
| Example-2 | 2.18 | 2.33 | — | — | 100 | 100 | 1-0 | 9,439 | 22,437 |
| Example-4 formulation #5 | — | — | — | — | 95 | — | — | — | — |
| Commercial | — | — | — | — | 95 | 95 | 1-low | 9,123 | 26,693 |

The foregoing has presented and described a sizing composition, method of producing sized glass fibers, and sized glass fibers that can be used in the production of molding compounds reinforced with glass fibers. The use of the composition, method, and sized glass fibers of the present invention, lead to glass fiber reinforcement for use in molding compounds, particularly sheet molding compounds, that has improved hardness and improved wet-out to give improved molding compound properties. The composition, method and sized glass fibers involve the use of a water dispersible or water soluble epoxy resin, a melamine formaldehyde resin reactive with a polyamide resin, a vinyl acrylic-epoxy resin blend, and one or more coupling agents possibly along with additional sizing composition agents.

I claim:

1. An aqueous sizing composition for glass fibers to produce treated glass fibers having increased hardness and improved integrity with good flow-through and wet-out properties, comprising in weight percent of the aqueous sizing composition:
   a. about 3 to about 20 weight percent of a substantially noncrystalline liquid epoxy resin in an aqueous dispersion wherein the epoxy resin is in the dispersion in an amount of 50 to 60 percent by weight of the nonvolatiles and has a weight per epoxide of around 500 to 550 and where the dispersion has an average particle size between 1 and 4 microns,
   b. about 3 to about 15 weight percent of melamine formaldehyde condensate,
   c. about 1 to about 8 weight percent of a polyamide resin wherein the ratio of amounts of melamine formaldehyde condensate to polyamide resin is in the range of about 2 to about 20 moles of melamine formaldehyde condensate to one mole of polyamide resin and wherein the polyamide resin is reactive with the melamine formaldehyde condensate to form a reaction product;
   d. about 0.1 to about 2 weight percent of one or more silane coupling agents,
   e. about 1 to about 12 weight percent of a thermoplastic plasticizing agent selected from the group consisting of vinyl acrylic copolymer and epoxy resin blend, polyurethane, a reaction product of a partial ester of a carboxylic acid and polyepoxy compound, silane polyvinyl acetate copolymer, and plasticized polyvinyl acetate and polyvinylacetate, and
   f. water in the remaining amount of the composition.

2. The sizing composition according to claim 1, wherein the formaldehyde melamine resin is present in an amount of around twice to six times the amount of polyamide resin.

3. The sizing composition of claim 1, wherein the reaction product of polyamide resin and melamine formaldehyde condensate is present in an amount in the range of about 1 to about 8 weight percent of the aqueous sizing composition.

4. The sizing composition of claim 1, wherein the thermoplastic plasticizing agent is a copolymer blend of polyvinyl acetate and an epoxy resin.

5. The sizing composition of claim 1, wherein the silane coupling agent is one or more cationic silanes having unsaturation in the compound.

6. The sizing composition of claim 1, wherein the silane coupling agent is selected from the group consisting of cationic silane coupling agents having unsaturation, silylated polyazamides, aminofunctional silanes or mixtures thereof wherein the amount of silane coupling agent is in the range of about 0.5 to about 2 weight percent of the aqueous sizing composition.

7. The sizing composition of claim 1 that has present an anti-static agent.

8. The sizing composition of claim 7, wherein the anti-static agent is ammonium chloride present in amount in the range of about 0.05 to about 1 weight percent of the aqueous sizing composition.

9. The sizing composition of claim 1 that has present one or more polyalkylene polyol lubricants in an amount of around 0.05 to about 4 weight percent of the aqueous sizing composition.

10. The sizing composition of claim 1 having present one or more propylene oxide surfactants in an amount in the range of around 0.05 to about 4.

11. The sizing composition of claim 1 having present fatty glycerides in an amount of around 0.05 to about 4 weight percent of the aqueous sizing composition.

12. The sizing composition of claim 1, wherein the melamine formaldehyde condensate is formed in-situ in the presence of the polyamide resin by contacting formaldehyde and melamine at condensate producing conditions.

13. Glass fibers having the dried residue of the aqueous sizing composition of claim 1.

* * * * *

UNITED STATES PATENT AND TRADEMARK OFFICE
CERTIFICATE OF CORRECTION

PATENT NO. : 4,330,444            Page 1 of 2

DATED : May 18, 1982

INVENTOR(S) : Gary A. Pollman

It is certified that error appears in the above-identified patent and that said Letters Patent are hereby corrected as shown below:

Column 1, line 32, "carier" should be --carrier--.

Column 3, lines 33 and 47, "malamine" should be --melamine--.

Column 3, lines 63 and 66, "malamine" should be --melamine--.

Column 12, Example III, line 12, "Epi-Rez ED 30115)" should be --(Epi-Rez ED 30115)--.

Column 11, Table I, lines 54 and 55, "(Propylene oxide) Surfactanct)" should be --(Propylene oxide Surfactant)--.

UNITED STATES PATENT AND TRADEMARK OFFICE
CERTIFICATE OF CORRECTION

PATENT NO. : 4,330,444　　　　　　　Page 2 of 2
DATED　　　 : May 18, 1982
INVENTOR(S) : Gary A. Pollman It is certified that error appears in the above-identified patent and that said Letters Patent are hereby corrected as shown below:

Col. 4, line 44, "epichlorhydrin" should read

--epichlorohydrin--.

Col. 5, line 5, "dispersion" should read --dispersions--.

Col. 12, line 12, "methacrylate-functional" should read

--methacrylate functional--.

Col. 12, line 49, "methacrylate-functional" should read

--methacrylate functional--.

Signed and Sealed this

Tenth Day of August 1982

[SEAL]

Attest:

GERALD J. MOSSINGHOFF

Attesting Officer　　Commissioner of Patents and Trademarks